United States Patent [19]

Bauer

[11] 4,003,465
[45] Jan. 18, 1977

[54] APPARATUS FOR DISTRIBUTING ARTICLES CONVEYED IN A ROW AMONG A PLURALITY OF PATHS OF TRAVEL

[76] Inventor: Everhard Bauer, 479 Paderborn, Hudeweg 2, Germany

[22] Filed: Nov. 22, 1974

[21] Appl. No.: 526,115

[30] Foreign Application Priority Data

Nov. 26, 1973 Germany .......................... 2358771
Jan. 17, 1974 Germany .......................... 2402145
July 26, 1974 Germany .......................... 2436151

[52] U.S. Cl. ............................... 198/442; 198/598
[51] Int. Cl.² .......................................... B65G 47/28
[58] Field of Search ............. 198/30, 31 R, 31 AB, 198/31 AC; 209/74 R

[56] References Cited

UNITED STATES PATENTS

| 1,923,753 | 8/1933 | Scofield ......................... 198/31 AC |
| 2,219,827 | 10/1940 | Kimball et al. ...................... 198/32 |
| 2,455,741 | 12/1948 | Dodge ............................ 198/31 AC |
| 2,528,196 | 10/1950 | von Till et al. ................... 198/31 R |
| 2,627,334 | 2/1953 | Koppel et al. ................. 198/31 AC |
| 2,710,089 | 6/1955 | Kerr et al. ........................... 198/30 |
| 2,847,107 | 8/1958 | Pennington ................... 198/31 AC |
| 2,987,251 | 6/1961 | Alexander, Jr. et al. ........ 198/40 X |
| 3,193,078 | 7/1965 | Amenta et al. ............... 198/31 AC |
| 3,326,349 | 6/1967 | Pettis et al. .................... 198/31 AC |
| 3,822,006 | 7/1974 | Shuttlesworth ............... 198/31 AC |

*Primary Examiner*—John J. Love
*Assistant Examiner*—Richard K. Thomson
*Attorney, Agent, or Firm*—Howard C. Miskin

[57] ABSTRACT

A guiding device is defined by lateral guides which are pivotally movable about a vertical axis disposed in the entrance portion of the guiding device. A star-shaped stepping wheel is connected to one of the guides to meter the articles passing therethrough. The stepping wheel has a crank arm eccentrically connected thereto which in turn is pivotally connected to the stationary frame. As the articles rotate the stepping wheel, the crank incrementally oscillates the guides such that they are essentially aligned with each of the two paths for one-half revolution of the wheel. A tongue member is pivotally mounted adjacent the entrance of the two paths and connected to the guides by a linkage which causes the tongue to pivot in a direction opposite that of the guides.

6 Claims, 9 Drawing Figures

APPARATUS FOR DISTRIBUTING ARTICLES CONVEYED IN A ROW AMONG A PLURALITY OF PATHS OF TRAVEL

This invention relates to apparatus for distributing articles conveyed in a row among a plurality of paths of travel.

Particularly in packaging operations, the articles which are individually delivered by filling and packaging machines and conveyed in a row by a conveyor must be distributed among two or more paths of travel so that the articles which are arranged one behind the other or one beside the other in rows can be combined in relatively large units in a simple manner. Individual pieces, such as bottles, tubes, cans or other packages are usually delivered by the filling or packaging machines either as single items or in sets and are conveyed in a straight row. For the market, groups of these articles are combined in larger packages. For this reason the articles conveyed in a row, e.g., from a filling machine must be guided onto parallel paths of travel extending one beside the other so that groups consisting of the desired number of articles and having the desired arrangement can then be separated and filled into cartons or deposited on trays.

In an apparatus which is of the kind described first hereinbefore and is known from the Opened German Specification 2,211,124, a slender triangular distributing member is provided to distribute the articles coming from one path of travel among two paths of travel. Each article passing the distributing member shifts the latter so that the distributing member distributes the articles in alternation among two paths of travel. Whereas this known distributing device has proved satisfactory, it has the disadvantages that each of the articles to be distributed must be individually moved onto the triangular distributing member because the same would otherwise be blocked by succeeding articles. To single the articles, they must be accelerated for a short time as they leave the path of travel preceding the member. The accelerated articles impinge on the distributing member and by their kinetic energy suddenly shift the distributing member. Impact stresses of the articles cannot be avoided too when the articles enter the paths of travel succeeding the distributing member. For this reason, the output capacity of the known apparatus is limited by the accelerations and impact stresses which occur. It is an object of the invention to provide a distributing apparatus which is of the kind described first hereinbefore and has a high output capacity.

This object is accomplished according to the invention in that a guiding device is provided, which is defined by lateral guides and is pivotally movable about a vertical axis disposed in the entrance portion of the guiding device, and means are provided which in response to the travel of the articles through the guiding device shift the same to deliver articles to successive ones of succeeding paths of travel and comprise drive means, which impart a pivotal movement to the guiding device and are controlled by the articles moving through the guiding device. Incoming articles which are closely spaced or which are spaced large distances apart and which have any desired cross-section can be distributed at a high rate among a plurality of paths of travel by the distributing apparatus according to the invention.

The guiding device can be shifted in a simple manner by a crank mechanism. The same may comprise a link, which at one end is pivoted to the guiding device at a point spaced from the pivotal axis of the guiding device whereas the other end of the link is rotatably mounted on a crank or eccentric disc which is rotatable about a vertical center line. When the articles are to be distributed among two paths of travel, control means may be provided which rotate the crank or eccentric disc through steps of 180°.

When it is desired to distribute the articles among three paths of travel, control means may be provided which rotate the crank or the eccentric disc through steps of 120°. In this case the diameter of the circle described by the crank, the length of the link, and the arrangement of the crank or eccentric disc will be selected so that the guiding device is pivotally moved to the correct positions.

According to another feature of the invention, the means for shifting the guiding device comprise a stepping wheel, which is mounted on one of the lateral guides and is rotatable about a vertical axis and protrudes into the passage defined by the guides and is arranged to be stepped by one tooth pitch by each of the passing articles, and a lever is rotatably mounted on the stepping wheel for rotation on a vertical axis which is eccentric to the axis of rotation of the stepping wheel whereas the other end of the lever is pivoted on a stationary vertical axis so that the free end of the passage defined by the guides oscillates between the two paths of travel during a rotation of the stepping wheel. The apparatus comprises substantially a four-bar linkage, which consists of the guiding device, the stepping wheels and a lever; these parts are pivotally connected. In this arrangement the stepping wheel acts as a crank which is driven by the articles travelling through the passage. The articles to be distributed may be guided in any desired manner through the distributing apparatus on a support, preferably a path of travel, provided that it is ensured that they are slidable on their support transversely to their direction of travel. Even if the preferably round articles travel through the distributing device in close succession and at high speed, the distribution will not involve disturbing accelerations or impact stresses. Because the guiding device is pivotally moved by a crank mechanism, this movement is retarded in accordance with a sine function to a stop at each end position so that the distribution of the articles involves almost no shock at all and the rate of distrubition can be much increased. The number of articles delivered to each path of travel depends on the number of teeth of the stepping wheel. The stepping wheel has preferably six teeth so that three articles or a set of three connected articles are delivered to each path of travel before a shift is effected.

According to another feature of the invention, a tongue which is directed toward the pivoted guiding device is disposed between the two paths of travel among which the articles are to be distributed and said tongue is arranged to perform a pivotal movement relative to the guiding device with a phase displacement of 180°. Owing to the provision of that tongue, which oscillates in phase opposition to the guiding device, the angle through which the passage must be moved to ensure a satisfactory distribution is reduced so that the output capacity is further increased.

In another embodiment of the invention, the tongue which is pivotally movable relative to the guiding device with phase displacement of 180° consists of a pivoted slender triangular distributing member, which has an elongated tip that is directed opposite to the direction of travel and which distributes the articles because it is shifted by each article when it has passed the member. It is sufficient to impart to the guiding device and the distributing member a pivotal movement over a distance which corresponds to one-half of the width of an article so that the mass forces which occur, which increase with the square of velocity, are much reduced and the output capacity of the apparatus can be increased.

The movement in phase opposition may be controlled in a simple manner if levers are secured to the pivots of the guiding device and of the distributing member and the free ends of said levers are pivoted to a link. In this arrangement the movement which is imparted to one pivoted part suitably by the article or articles as they pass is thus transmitted in the proper phase direction to the other pivoted part.

Particularly in operations involving high speeds of travel and/or short articles or sets of articles, the articles or sets of connected articles themselves can no longer shift the distributing mechanism with the required accuracy. For this reason an additional feature of the invention resides in that the machine drive is used to effect the controlled shifting of the guiding device and the distributing member. This shifting may be derived, e.g., from the conveyor belt moving under the distributing device.

Illustrative embodiments of the invention will be explained more fully hereinafter with reference to the accompanying drawing, in which.

Figure 1:
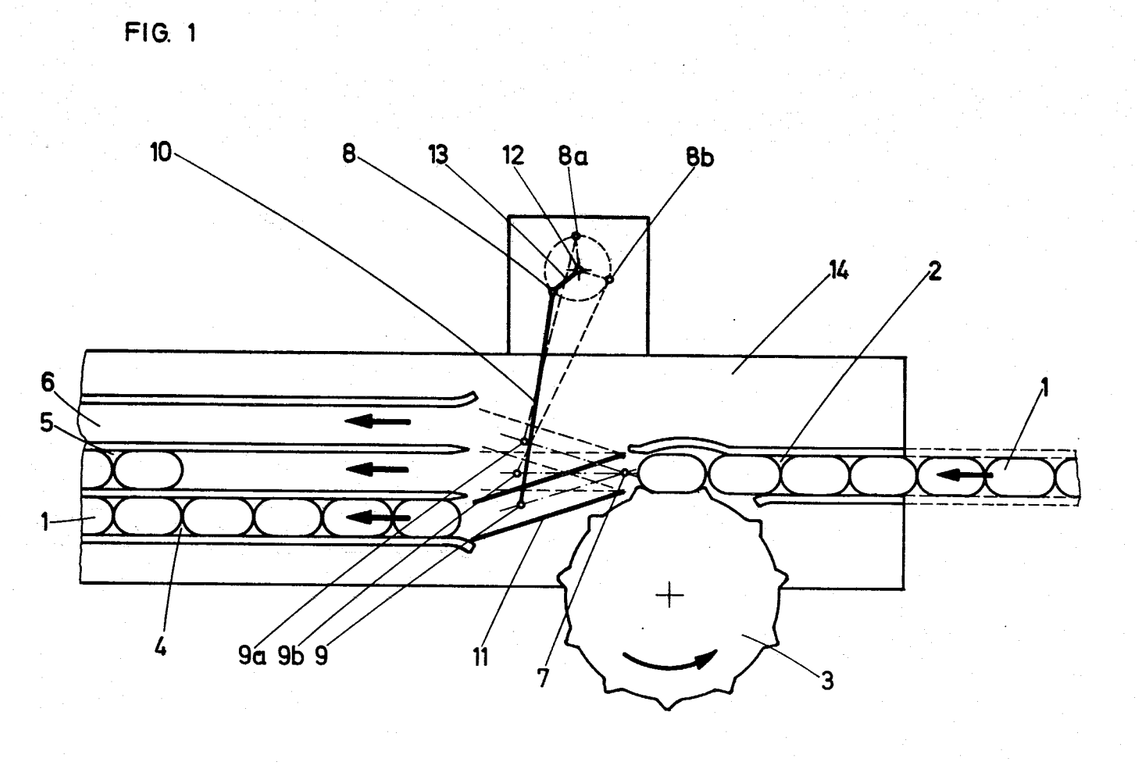
FIG. 1 is a diagrammatic top plan view showing a distributing apparatus.

In the apparatus shown in FIG. 1, a distributing apparatus and guides which define paths of travel 2, 4, 5, 6 are disposed above a conveyor belt 14 and carried by supports, not shown, which are fixed to the machine. Articles 1 to be distributed are fed along the path of travel 2, defined by lateral guides, by a conveyor which is not shown and are then received by the conveyor belt 14. The articles 1 being fed may be closely spaced or may be spaced large distances apart. The path of travel 2 opens into a passage, which is defined by lateral guides of a member 11, which is pivoted on a vertical axis 7 disposed at the entrance portion of the member. The member 11 is pivotally movable so that its passage can connect the preceding path of travel 2 to succeeding paths of travel 4, 5, 6. Drive means for imparting a pivotal movement to the member 11 comprise a driven crankshaft 12 having a crank 13 to which a link 10 is pivoted by a crankpin 8 whereas the other end of the link is pivoted at 9 to the member 11. Instead of a crank, an eccentric disc having an eccentricity 13 may be used. By the control means, the crank 12, 13 is intermittently rotated through steps of 120° so that the crankpin is held at points 8, 8a and 8b during the respective transfer times. The positions 9, 9a and 9b of the member 11 are associated with the crank positions 8, 8a, and 8b.

In the embodiment shown by way of example the crank mechanism is controlled by the stepping wheel 3, which is provided with teeth or recesses. The stepping wheel 3 extends through a lateral guide into the preceding path of travel 2 and is moved in steps of one tooth pitch by each of the articles to be distributed. The stepping wheel shaft, not shown, may be connected to a counting wheel or may carry contacts, which after the passage of one article or a group of articles 1 deliver a shift control pulse to the means for driving the crankshaft 12 or to a clutch which connects said crankshaft to the machine drive. Each shift control pulse causes the crankshaft 12 to turn through 120° so that the member 11 is successively moved to register with the succeeding paths of travel 4, 5, 6 in succession.

Each succeeding path of travel 4, 5, 6 is desirably fed with a plurality of articles 1 before a shift so that the output rate of the distributing plant is not adversely affected by excessively frequent shifts and the forces involved therein.

Figure 2:
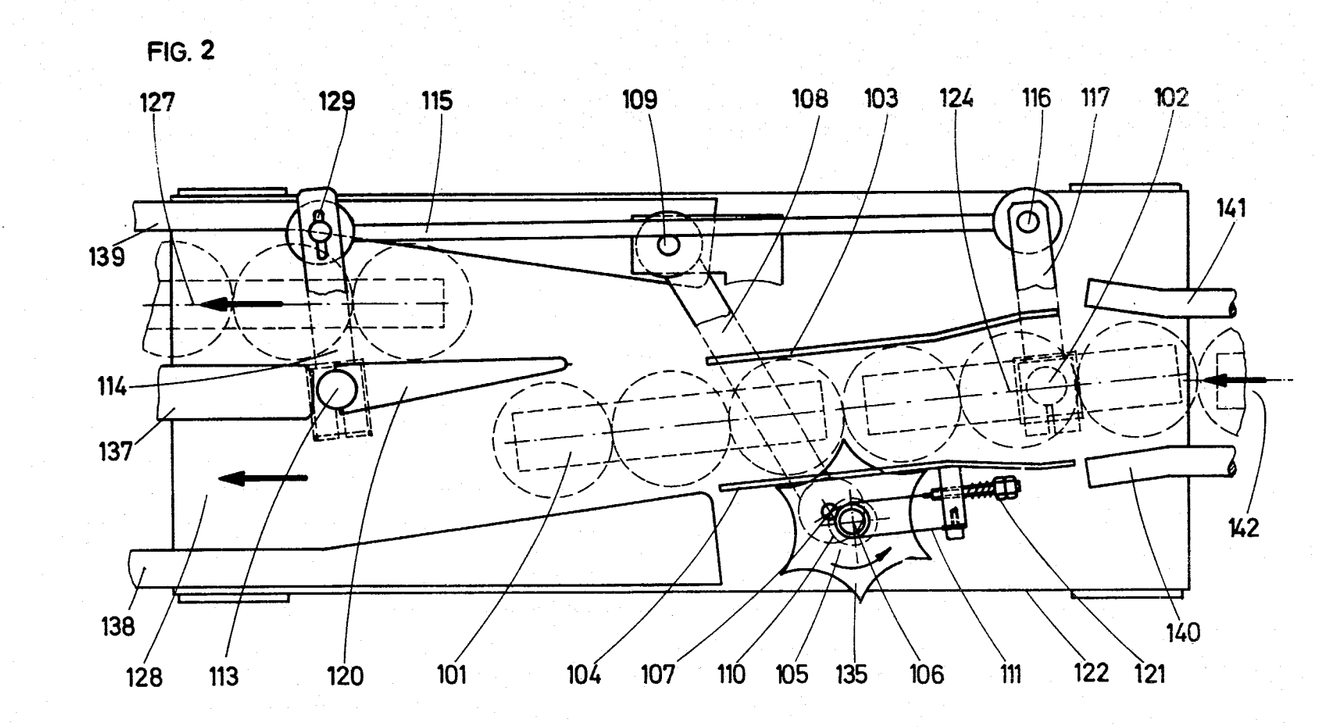
FIG. 2 is a diagrammatic top plan view showing another distributing apparatus.
Figure 3:
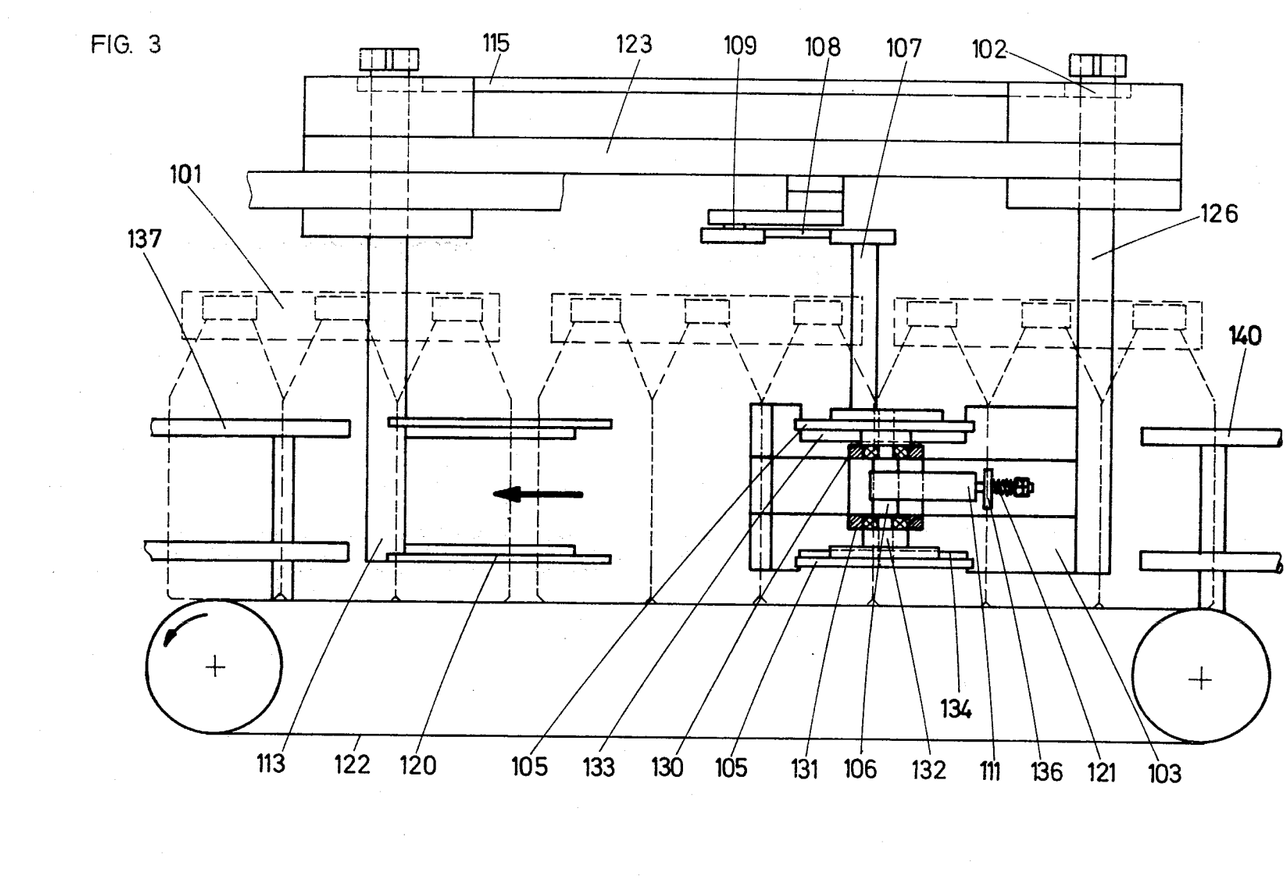
FIG. 3 is a side elevation showing the distributing apparatus according to FIG. 2.

FIGS. 2 and 3 show a distributing apparatus which is disposed above a conveyor belt 122 and carried by a support 123, which is fixed to the machine. Lateral guides 103, 104 of the distributing member flare at one end like a funnel and at said end are secured to supports 126, which are connected by a yoke. A pin 102 is secured to the yoke vertically over a center line 124 and is rotatably mounted in the support 123, which is fixed to the machine. A lever 117 is secured by the screw clamp to a pin 102. The link 115 is connected by a pivot 116 to the free end of the lever 117.

A pivoted tongue 120 separates paths of travel 127, 128 and is secured to a shaft 113, which is also rotatably mounted in the support 123, which is fixed to the machine. A lever 114 is secured by a screw clamp to the shaft 113. The other end of the link 115 is connected to the free end of the lever 114. The pivot is slidably adjustable in a slot 129 so that the distance of the pivot from the shaft 113 is adjustable and with it the angular movement of the tongue 120. The levers 114 and 117 are secured to the shaft 113 and the pin 102 in such a manner that the distributing member 103, 104 and the tongue 120 are pivotally moved in phase opposition.

Bearing brackets 130, 131 are secured to the guide 104 on the outside thereof. By means of rolling element bearings, a shaft 132 is mounted in said brackets. Star-shaped stepping wheels 105 are secured to the shaft 132 at the free ends thereof. Teeth 135 of said star-shaped stepping wheels extend through slots 133, 134 of the guide 104 into the passage which is defined by the guides 103, 104. A pivot 107, which is eccentric to the center line 106 of the shaft 132, is secured to the upper disc of the star-shaped stepping wheel 105. A lever 108 is rotatably mounted on the free end of the pivot 107. The other end of the lever 108 is connected to the frame by a pivot 109, which is fixed to the frame. A brake band 111 is trained around the stepping wheel shaft 132, and the two ends of said band are secured to a support 136, which is secured to the guide 104. One end of the brake band 111 is tensioned by a spring 121, the initial stress of which is variable by a screw.

Guides 137, 138, 139, 140, 141 consist of two guide rails each, which are spaced apart and guide only the upper and lower end portions of each of the articles to be distributed. The tongue 120 consists also of two spaced apart, parallel plates. All guide rails and guides consist of a low-friction material or are provided with a low-friction covering.

The star-shaped stepping wheel 105 and the lever rotatably mounted on the pivot 107 secured to said wheel form a crank. The pivot 107 revolves around the shaft 132 on the crank circle 110.

The mode of operation of the apparatus will now be explained with reference to the distribution of sets 101 or three bottles, which are arranged one behind the other in a row and connected by triangular connectors of cardboard. The sets are fed on a path of travel 142 and enter the distributing member 103, 104. Each bottle moving through the distributing member steps the six-tooth star-shaped stepping wheel 105 by one tooth pitch. Each of said steps, in turn, causes the crank to swing the guides 103, 104 incrementally. The guides 103, 104 are essentially aligned with path 127 for three steps and the path 128 for the other three steps. The entrance of the sets into the paths of travel 127, 128 is facilitated by the tongue 120, which is controlled to move in phase opposition so that the return pivotal movement taking place during the transfer has no adverse effect. The distributing member 103, 104 and the tongue 120 are so matched that an undisturbed transfer and distribution are ensured. Because the tongue 120 is controlled to move in phase opposition, it is sufficient for the distributing member 103, 104 to move over a distance which is approximately one bottle diameter so that the apparatus will operate smoothly even at high speed.

Figure 4:
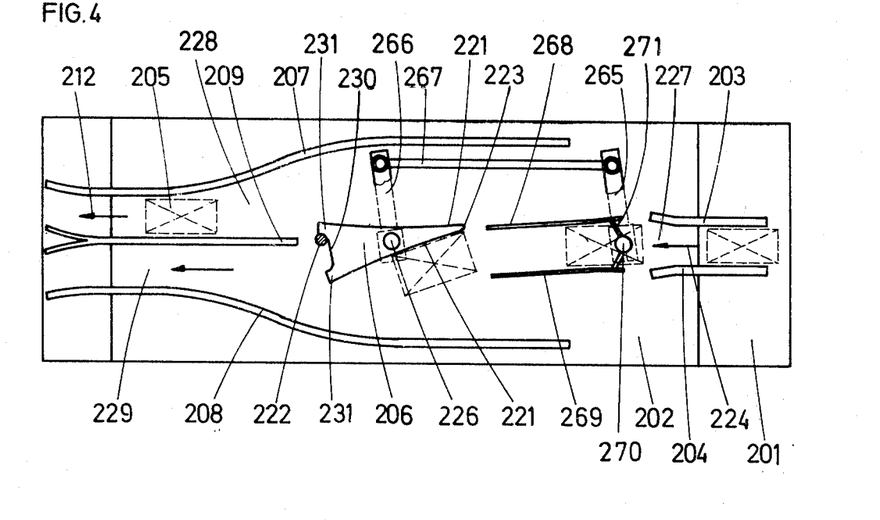
FIG. 4 is a top plan view showing a distributing deflector.

In the arrangement of FIG. 4, articles 205 are fed by a conveyor belt 201 onto an accelerating belt 202, which moves at twice the speed of travel of the feeding belt 201. On the accelerating belt, articles 205 are initially guided by laterally disposed guides 203 and 204 in the direction of travel indicated by an arrow 224. At the end of guides 203 and 204, the articles enter the guiding device, which comprises lateral guides 268, 269. From said guiding device, the articles enter the range of a distributing member 206, which is pivoted on a pivot 226 disposed in the central portion of member 206. The pivotal movement of the distributing member 206 is limited by a pin 222, which is disposed in a recess 230 in the base of the triangular distributing member 206. The recess 230 is so arranged that stops 231 are provided at the sides of the distributing member 206. The articles which have been fed slide along the sides 221 of the elongated distributing member, which sides are of equal length, and the articles are then delivered in alternation to paths of travel 228 and 229. As soon as an article has been fed beyond the pivot 226 of the distributing member 206, the latter is shifted and the article is fed onto the path of travel which has thus been opened and the deflector consisting of the distributing member 206 is in such a position that the next following article is delivered to the parallel path of travel. When a single row 227 of articles has been divided into the two rows 228, 229, the articles 205 move from the accelerating belt 202 onto a decelerating strip 212, on which the articles assume a close spacing again. The guiding device 268, 269 is secured to a shaft 270 by a U-shaped member 271, which is arranged in the entrance portion of the guiding device. The shaft is rotatably mounted in a suppoort 272, which is fixed to the frame.

Figure 5:
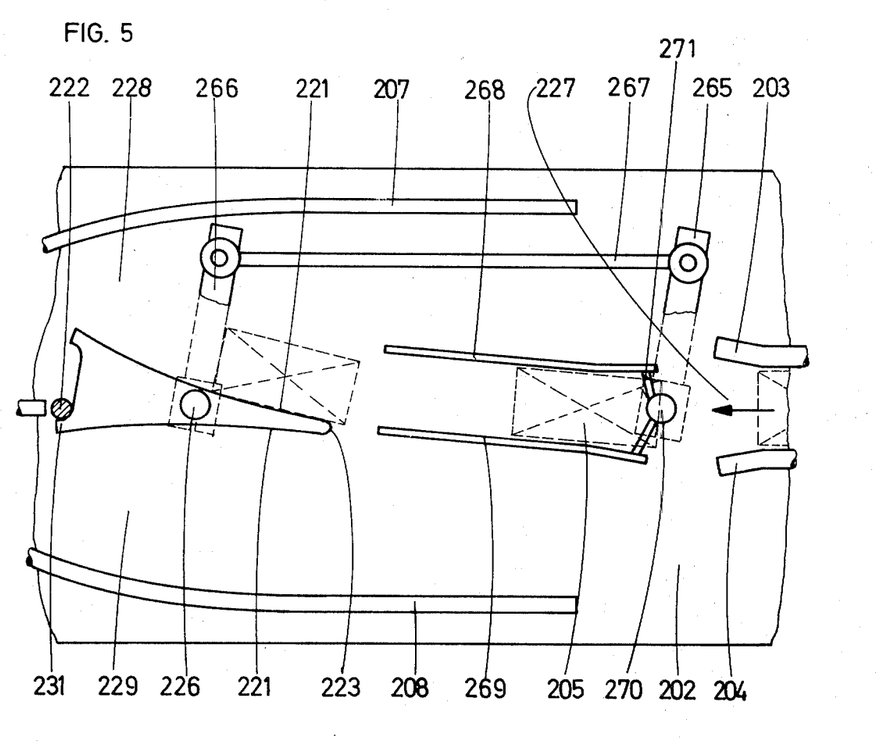
FIG. 5 is an enlarged top plan view showing the distributing member and the guiding device.
Figure 6:
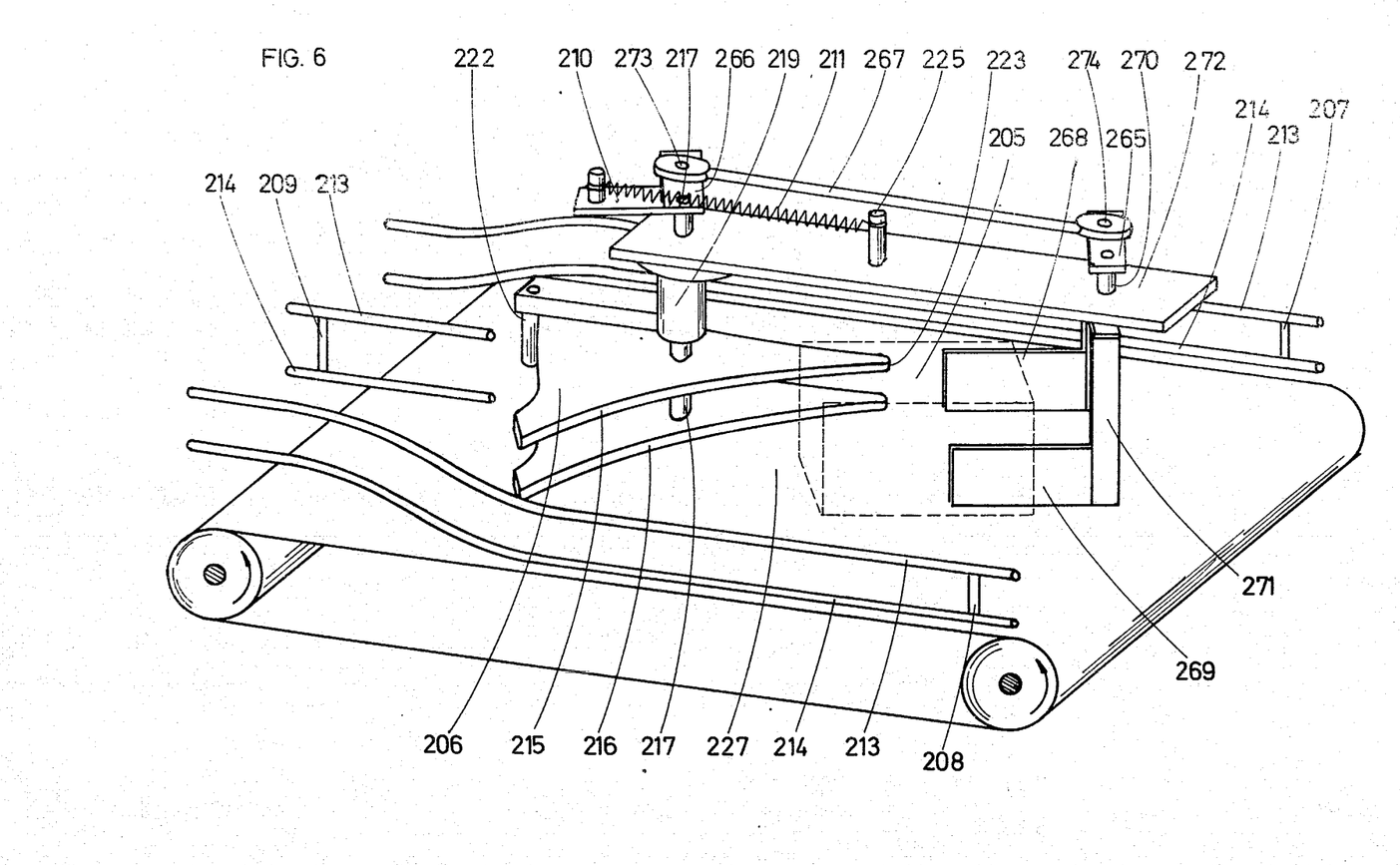
FIG. 6 is a perspective view showing a distributing deflector.

The triangular distributing member consists of two plates 215, 216, which are disposed one over the other and secured to a shaft 217. The same is mounted in a bearing 219 carried by the support 272, which is fixed to the frame. A projecting lever arm 210 is secured to the free shaft end and extends opposite to the direction of travel. A tension spring 211 extends from the free end of the lever arm to a pin 225, which is secured to the machine frame. The lever arm 210 extends in the direction of the center line of the distributing member 206. The pin 225 is disposed on the center line of the preceding path of travel 227 so that the distributing member is in its dead center position when the tip 223 of the distributing member is disposed on the center line of the preceding path of travel 227. This arrangement ensures that the distributing member is retained in its end position by spring force and cannot flutter. Another lever 266 is secured to the free end of the shaft 217. A pivot 273 connects the end of the lever 266 to one end of the link 267.

At its free end, which extends through a support 272, the shaft 270 of the guiding device is also connected to a lever 265. A pivot 274 connects the end of this lever to the other end of a link 267. The pivots connecting the link 267 to the levers 265 and 266 may be arranged to be adjustable in a manner which is not shown.

The levers 265 and 266 and the link 267 which connects said levers are so arranged that the distributing member 206 and the guiding device 268, 269 are coupled to perform pivotal movements in phase opposition. The pivotal movement is transmitted in the proper phase relation from the distributing member 206 to the guiding device 268, 269. The distributing member 206 and the guiding device are so matched that an undisturbed transfer and distribution are ensured. Because they are controlled to move in phase opposition, it will be sufficient for the distributing member and the guiding device to move during the distributing operation over a distance which is about one-half of the diameter of the article so that the apparatus operates smoothly even at very high speed.

Figure 7:
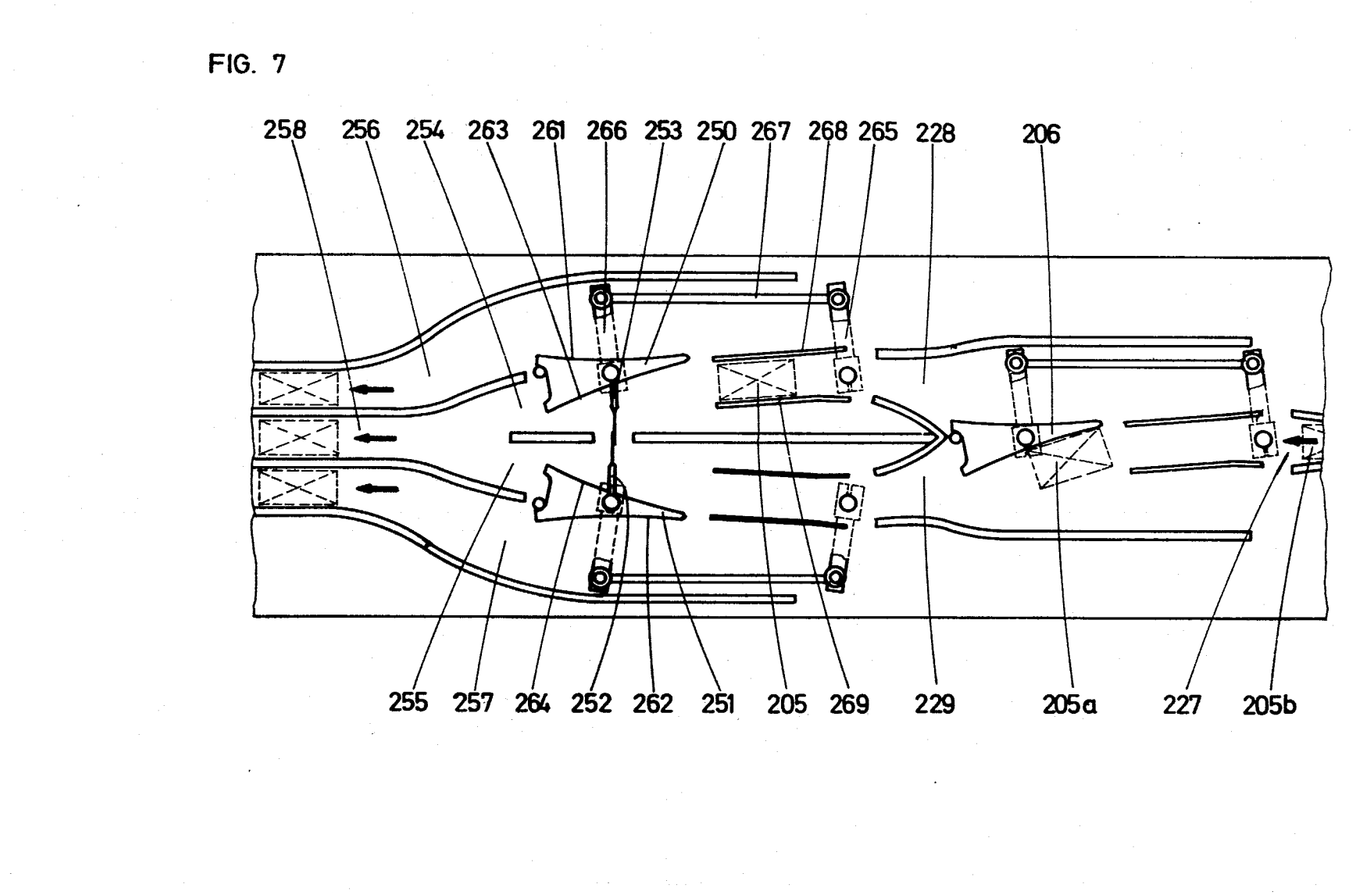
FIG. 7 is a top plan view showing a distributing deflector for distributing articles among three paths.

FIG. 7 shows three distributing members and associated guiding devices moving in phase operation thereto. These means receive articles from one path and distribute them among three paths. The principle of this distribution among three paths is known from the Opened German Specification 2,224,858 so that it need not be explained here more fully.

Figure 8:
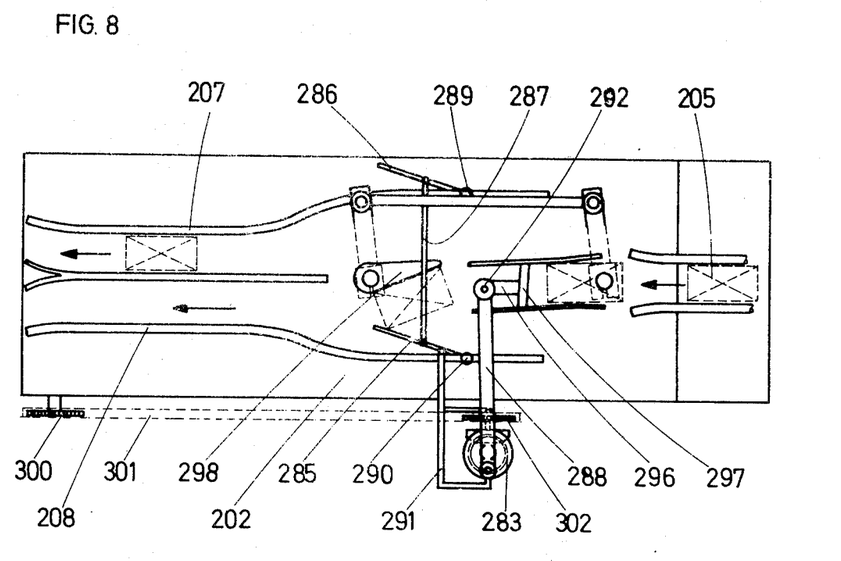
FIG. 8 is a top plan view showing a distributing device in which a distributing deflector and a guiding device are shifted by the machine drive.
Figure 9:
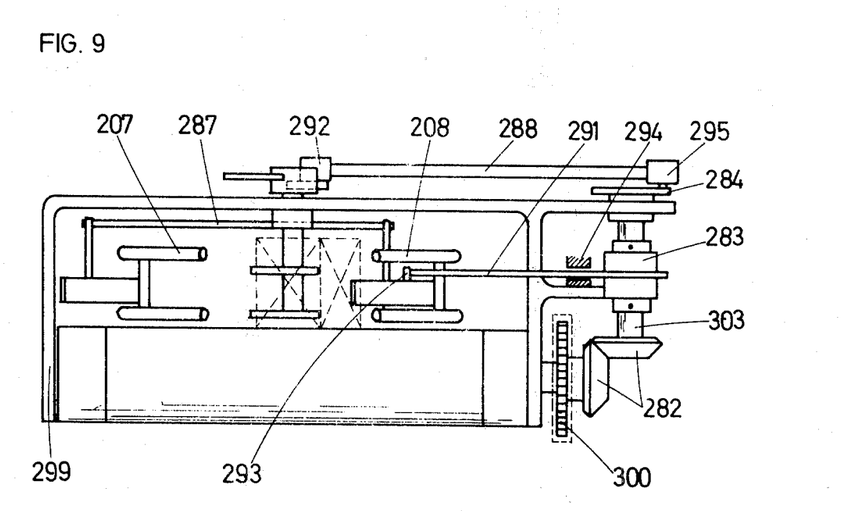
FIG. 9 is an elevation showing the apparatus of FIG. 8 viewed in the direction of arrow A.

FIGS. 8 and 9 show a distributing apparatus in which a guiding device 297 and a distributing member 298 are not shifted by the passing articles but are shifted by drive means operated by the machine drive.

A conveyor belt 202 is driven by a pulley, not shown, on the shaft of which a chain sprocket 300 is keyed, which drives a chain sprocket 302 by a chain 301. The chain sprocket 302 is secured to a shaft which is mounted in the machine frame 299 and which at its free end carries a bevel gear of a bevel gear train 282. The bevel gear train 282 drives a shaft 303, which is vertically mounted in a machine frame 299 and which at its opposite free end carries a disc 284, to which a push rod 288 is connected by a pivot 295. The opposite end of the push rod 288 is connected by a pivot 292 to the pivoted guiding device 297 near that end thereof which is opposite to its pivotal axis.

The guiding device 297 and the distributing member 298 are interconnected by levers and a link in an arrangement like that shown in FIGS. 1 and 2.

A one-half revolution overrunning clutch 283 is incorporated in the shaft 303. This one-half revolution overrunning clutch may consist, e.g., of the BAT single-revolution overrunning clutch of Stieber & Nebelmeier, of Munich, Germany. Said clutch comprises an overrunning input ring, which constitutes the input member, and a camwheel, which is arrested by a stop. The entire output side is stopped with the camwheel. The one-half revolution overrunning clutch 283 is operated by a shift control lever 291 and locking levers, not shown, which are adapted to be engaged and disengaged in alternation and are mounted on the camwheel and spaced 180° apart. The shift control lever 291 is operated by shift control levers 285, 286, which are pivoted at 289, 290 and are also pivoted to and connected by a link 287. The shift control lever 291 is pivoted to the shift control lever 285. During the passing of each article 205, the shift control levers 285, 286 are shifted so that the shift control lever 291 shifts the locking levers which engage the camwheel of the one-half revolution overrunning clutch 283 to release the camwheel for half a revolution. When the camwheel is released, the disc 284 is driven by the drive means of the machine to perform one-half of a revolution whereby the guiding device 297 and the distributing member 298 are shifted in opposite senses. Because the crank function of the disc 284 causes the shifting to be performed in accordance with a sine function, shock stresses on the guiding device and distributing member are avoided. This is of advantage particularly where high speeds of travel are involved.

The link 287 is connected to the shift control levers 285, 286 in such a manner that the guiding devices 207, 208 do not hinder the shift. A guide 294 is provided for the shift control lever 291.

What is claimed is:

1. Apparatus for distributing articles conveyed in a single row at a receiving station into a plurality of juxtaposed rows at a downstream delivery station, comprising means defining at said delivery station a plurality of juxtaposed delivery tracks for said articles with mouths facing said receiving station, gate means defining a passageway for said articles with an inlet adjacent said receiving station and an outlet pointing in the downstream direction, said gate means being mounted for pivotal motion about an axis at said inlet whereby said outlet can be oscillated, and drive means operable by said articles passing through said passageway for effecting pivotal motion of said gate means, said drive means comprising a wheel mounted on said gate means for pivotal motion in unison therewith and for independent rotation, teeth on the periphery of said wheel projecting into said passageway for engagement by said articles whereby said wheel is rotated by said articles, and a lever eccentrically pivoted to said wheel by one end pivoted to a fixed frame by the other end whereby said wheel and gate means are pivoted once to and fro during each complete turn of said wheel.

2. Apparatus according to claim 1, including adjustable brake means acting on said wheel.

3. Apparatus according to claim 1, including a deflector tongue having a tip pointing in the upstream direction, said tongue being disposed between said gate means and said delivery tracks and being mounted for pivotal motion about an axis at a downstream end thereof whereby said tip can be oscillated substantially parallel to said conveying plane.

4. Apparatus according to claim 3, including link means coupling said gate means and said deflector tongue for pivotal motion in unison but in opposite senses.

5. Apparatus according to claim 1, and further including conveyor means for leading said article toward said receiving station along a conveying plane, said gate means being oscillated substantially parallel to said conveying plane.

6. Apparatus according to claim 1, wherein said mouths of the delivery tracks flare outwardly.

* * * * *